(12) United States Patent
Macouzet Díaz Leal et al.

(10) Patent No.: US 11,813,644 B2
(45) Date of Patent: Nov. 14, 2023

(54) METHOD AND SYSTEM FOR DETERMINING THE MANUFACTURE OF A GLASS CONTAINER WITH ITS MOLD NUMBER

(71) Applicant: Vitro, S.A.B. de C.V., San Pedro Garza Garcia (MX)

(72) Inventors: Adrián Enrique Macouzet Díaz Leal, Tlalnepantla (MX); Alejandro Becker Del Río, Atizapan de Zaragoza (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 415 days.

(21) Appl. No.: 17/277,459

(22) PCT Filed: Sep. 18, 2018

(86) PCT No.: PCT/MX2018/000088
§ 371 (c)(1),
(2) Date: Mar. 18, 2021

(87) PCT Pub. No.: WO2020/060383
PCT Pub. Date: Mar. 26, 2020

(65) Prior Publication Data
US 2021/0268550 A1     Sep. 2, 2021

(51) Int. Cl.
*B07C 5/34* (2006.01)
*G06K 7/10* (2006.01)

(52) U.S. Cl.
CPC .......... *B07C 5/3412* (2013.01); *B07C 5/3408* (2013.01); *G06K 7/10861* (2013.01)

(58) Field of Classification Search
CPC .......................... B07C 5/3412; B07C 5/3408; G06K 7/10861; C03B 9/41; G01N 21/9045; Y02P 40/57
See application file for complete search history.

(56) References Cited

U.S. PATENT DOCUMENTS

| 3,745,314 A | 7/1973 | Mathias et al. |
| 3,963,918 A | 6/1976 | Jensen et al. |

(Continued)

FOREIGN PATENT DOCUMENTS

| EP | 0887120 A1 | 12/1998 |
| EP | 1870835 A2 | 12/2007 |

(Continued)

*Primary Examiner* — Tony Ko
(74) *Attorney, Agent, or Firm* — THE WEBB LAW FIRM

(57) ABSTRACT

The present invention relates to a method and system for determining the manufacture of a glass container with its mold number. The method consists of marking the molds according to a system of pre-established coordinates based on a Fibonacci system or sinusoidal system, for identifying a mold number with the container that has been formed in that mould. Control means are programmed with the sinusoidal or Fibonacci coordinate system according to various coordinate points of each mold. The containers are formed with a bead or protuberance located at the bottom of each container according to the pre-established coordinate system. The recently formed containers are transported on a conveyor belt. Optical means are used to inspect the containers to identify, by means of the position of the bead or protuberance, the mold number related to the container.

16 Claims, 5 Drawing Sheets

(56) References Cited

U.S. PATENT DOCUMENTS

| | | | |
|---|---|---|---|
| 4,175,236 A | | 11/1979 | Juvinall |
| 4,201,338 A | | 5/1980 | Keller |
| 4,230,266 A | | 10/1980 | Juvinall |
| 4,644,151 A | | 2/1987 | Juvinall |
| 4,691,830 A | | 9/1987 | Ahl et al. |
| 4,816,668 A | * | 3/1989 | Williams .............. B07C 5/3412 235/462.03 |
| 5,028,769 A | | 7/1991 | Claypool et al. |

FOREIGN PATENT DOCUMENTS

| | | |
|---|---|---|
| FR | 2882594 A1 | 9/2006 |
| GB | 2033120 A | 5/1980 |

\* cited by examiner

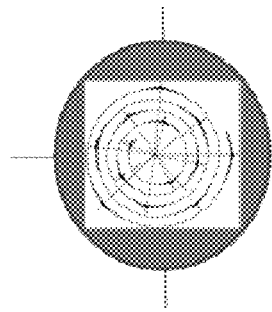
FIG. 5
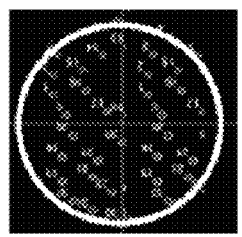
FIG. 5A
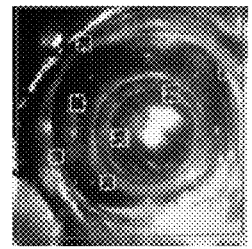
FIG. 5B
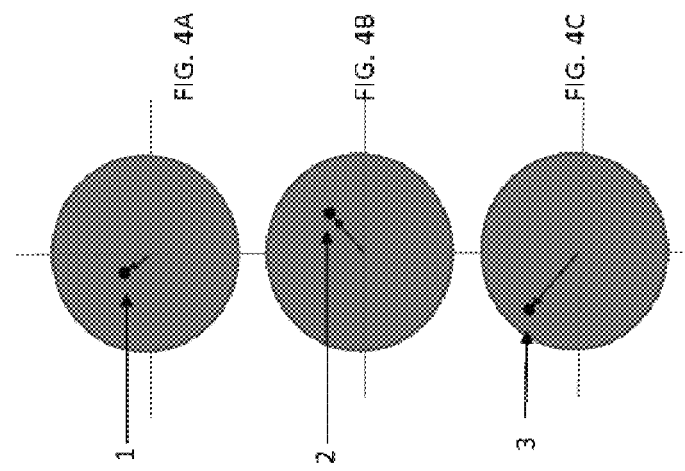
FIG. 4A
FIG. 4B
FIG. 4C

METHOD AND SYSTEM FOR DETERMINING THE MANUFACTURE OF A GLASS CONTAINER WITH ITS MOLD NUMBER

CROSS-REFERENCE TO RELATED APPLICATION

This application is the United States national phase of International Application No. PCT/MX2018/000088 filed Sep. 18, 2018, the disclosure of which is hereby incorporated by reference in its entirety.

BACKGROUND OF THE INVENTION

Glassware such as glass bottles are normally produced in glassware forming machines as those which can include multiple similar individual forming sections by the blow-blow process, while wide-mouth jars, glasses and other glass products are produced in forming machines known as Series "E" and "F" by a press-blow process, and other containers that can also be a process through a direct press method, the so-called "hot mold".

During the containers manufacturing process by means of a blow-blow or blow press process, the glass in the form of a gob is introduced into a parison or preformed mold in the parison forming station, where, depending on the process, the gob settles by means of a blowing or vacuum process to the lower part of the parison mold to form the crown of the container. Then, once the container crown is formed, a counterblow is made to form a parison or preform of the container. Subsequently, the container preform is transferred by a reversing mechanism with a 180 degree movement of the parison mold to a final blow mold of the forming station or final blow mold, where final shape is given to the container. Finally, the newly formed container is transferred by a pushing mechanism to a dead plate at the front of the machine and then transferred by means of a conveyor belt to a tempering furnace where the container is decorated or packed.

After the bottles or containers are obtained, they are submitted to highly sophisticated automatic quality controls. From tension simulators to remove excessively brittle product, to dimensional, thickness and appearance controls by means of optoelectric machines to avoid cracks, burrs, dirt, bubbles and so on.

In this process an identification code placed on the article is very useful to associate a defect with the corresponding mold. In this way, you can instantly know which mold the defective product comes from and proceed to repair the mold.

There are now identification codes called "marker points". Its number and its arrangement between spaces form an identification code (a sort of "dot-space-dot" Morse code) that is easily recognized by optomechanical means. Furthermore, it is not possible for the identification code to be detached from the container, since it is part of the container itself.

The embossed dots engraved on most glass containers are traceability elements and serve to ensure the quality of the container.

In order to keep an exhaustive quality control of the manufacturing batches, each mold has a series of protuberances (dots) arranged in a different way for each mold. If a defective one is found, the batch/mold to which it belongs can be quickly checked.

Each of these containers, once manufactured, goes through a series of inspection and control machines to check compliance with all container specifications. These machines, in addition to rejecting containers out of specification, record the corresponding fault, which they associate through dots with the section that manufactured them. Other commercial systems are also used to identify the mold such as the use of CID3 or alpha numeric or simply numeric alpha recognized by a vision pattern.

Example of CID3, used in common containers of carbonated beverages, beers, wines and liquors, this pattern is almost impossible to place in a small container intended for perfumery, the effect would be unsightly.

A control system, which is continuously fed back, pinpoints the most likely cause of the rejection and, based on this, by means of an automatic regulation system is able to act on the cause (or even block that section if the number of rejections exceeds the preset value) with a dual purpose of improving quality and productivity.

Usually, commercial glass containers contain a trademark, mold number, plant or location number and the date of manufacture located at the bottom of the container affecting the presentation of high perfumery, such containers should have a clean and aesthetic presentation in the container.

Identification codes, as previously discussed, can have different forms, such as a bar code, a dot code or a ring code, whose bars, dots or rings may protrude from the side wall or bottom surface of the bottle.

For example, U.S. Pat. No. 4,691,830 relates to a system for inspecting and classifying molded containers that contain readable markings indicating the cavities of the original molds of the containers; said system is characterized in that it comprises: a first conveyor that serves to transport the containers along a predetermined path; an inspection device, located in said path, to inspect the containers moving in the path and to identify the cavities of the original molds of the defective containers; a device for identifying cavities, placed in that path, to read the markings on the containers that move along the path, and to selectively classify the containers that come from that path, as a controllable function of the identification of cavities; a first control device, coupled with the inspection device, to receive the information that identifies the original mold of the defective containers, and which is also coupled with the cavity identification device to selectively control the device cavities identification device, in order to classify the containers, a sample testing device that includes a second conveyor, and which is coupled with the cavities identification device to receive the sampled containers from it, and a device that it is coupled with the second conveyor to automatically check the physical quality of the sampled containers, and to identify the source mold of defective sampled containers and a second control device, coupled with the sample testing device, and; through the first control device, coupled with the cavity identification device, to automatically classify a preselected sample of containers from each well, from said path, and to orient the preselected sample of containers towards the sample testing device.

Keller's U.S. Pat. No. 4,201,338 relates to the identification of a mold in which a container made of an optically transparent material has been molded. The container is provided with a plurality of marks disposed about a path on the wall of the container. There is a first set of marks disposed above the path and a second set disposed below the path. One of the first or second sets contains code marks for providing an indicia of the mold and the other set contains timing marks suitable for sequential reading of the code marks. The marks are illuminated by a light path as the vessel is moved and the diffraction or reflection of the light caused by the marks is evaluated. Time pulses are generated in response to the evaluation of the timing marks for sequential reading of the code marks.

U.S. Pat. No. 4,230,266 by Juvinal, et al, describes a system for determining which of a plurality of molds produced a particular container. A specific concentric ring code is molded into the bottom of each container as it is produced. This code is defined by absence or presence of rings at possible ring positions. No rings are formed in adjacent positions. The containers are then pass by a reading station, where light whose intensity is proportional to the angle of incidence is projected onto the bottom of the container. The variation of the intensity of the light reflected to a particular point is used to determine the position of the rings on the container and appropriate electronics may then decode the ring position to determine the container code, thus permitting identification of the mold which produced each container.

In U.S. Pat. No. 4,644,151 by Juvinall, et al, relates to a method and system for identifying a molded container such as a glass bottle with its mold of origin, and a corresponding container. Each container has molded therein a plurality of markings in the form of surface bumps or protrusions extending in an arcuate array at uniformly spaced indicia positions around the container heel perpendicularly of the container axis. The indicators are grouped in sets of two adjacent indications positions, the sets of two configurations being mutually unique, so that the sets as a whole identify a binary code associated with the container mold of origin. The method and system for reading such code in accordance with the description contemplate directing a source of diffused light energy onto the container heel, with such energy having an intensity gradient at predetermined orientation with respect to the container axis. A camera is positioned to receive light energy reflected by the heel and is monitored to read the coded indicia as a function of alternation of the normal reflection pattern by the bumps or protrusions.

U.S. Pat. No. 5,028,769 Claypool, et al, referring to an apparatus for reading code elements which are released from a container. A light source is typically projected while the container is rotated to sequentially illuminate each of the code elements. A sensor receives light which is reflected approximately normal to the surface of the container but avoids light which is reflected from the surface of each code element at an appreciable angle relative to the normal. The intensity of the reflections from regions of said container not containing a code element are relatively large compared to reflections received from portions of the container surface containing a code element and a threshold is set therebetween.

However, although many identification systems use certain code numbers, these are always marked on the bottom edge of the bottle and, if they are not well marked on the mold due to wear, mold lubrication stains, etc., they can generate erroneous codes that, when passed through the inspection equipment, identify the product as defective, indicating that the mold of origin is forming defective containers, which forces the forming unit to stop, either to check the mold or to change it.

Another problem with identification marks is that when they are on the edge of the container, they affect the image of the containers, especially in containers for the perfumery industry, which requires greater design, since in addition to the fragrance, they seek to highlight their product with a prominent form of packaging. Therefore, the container presented to the consumer is a further element of marketing strategy and a key issue to connect with the consumer. The container or bottle quickly tells us what perfume we have in front of us, who is behind it and what values can be directly associated with them. Side marking highly affects the image of the containers and therefore, the image of the product.

Accordingly, the present invention relates to a method and system for determining the manufacture of a glass container with its mold number, which does not require complicated marks and which, by means of an artificial vision system identifies the mold number formed by means of a single coordinated point which has been engraved as a small glass bead on the bottom of the container (of regular and irregular shapes). The x, y, z coordinate points are defined through a pattern defined by a Sine wave for irregular containers and, for cylindrical containers, through the pattern of a Fibonacci series.

The etched dot or glass bead will be detected by means of an optical position recognition system, which will determine the cavity number related to the container.

This equipment will be placed on a known conveyor belt system, such as a container separator mechanism, which will allow the container to be conveyed in a linear manner, allowing the location of the bead on the bottom of the container to determine the number of cavity or mold.

SUMMARY OF THE INVENTION

Therefore, the present invention refers to a method and system for determining the manufacture of a glass container with its mold number, which uses a Fibonacci modulation code or sinusoidal system that allows, in case of rejection of containers in the inspection area, to identify the mold number producing a defective article.

The other objective of the present invention is to provide a method and system for determining the manufacture of a glass container with its mold number, which allows to process operation and quality requirements, such as rejects, separation and reprocessing, which can be applied to any type of commercial container, potentiating the development for the aesthetic market of perfumery containers.

An additional objective of the present invention is to provide a method and system for determining the manufacture of a glass container with its mold number, which allows obtaining statistical information on quality and productivity.

These and other objectives and advantages of the present invention will be evident to experts in the field of the following detailed description.

BRIEF DESCRIPTION OF THE DRAWINGS

FIG. 4A to 4C is a schematic diagram showing the use of the Fibonacci coordinate method for reading cylindrical containers;

FIGS. 5 and 5A schematically show, in screen mode, a visual representation of coordinate patterns with the Fibonacci series pattern;

FIG. 5B shows a photograph of the circular bottom of a container, schematically showing the points that can be generated by the Fibonacci system;

DETAILED DESCRIPTION OF THE INVENTION

Figure 1:
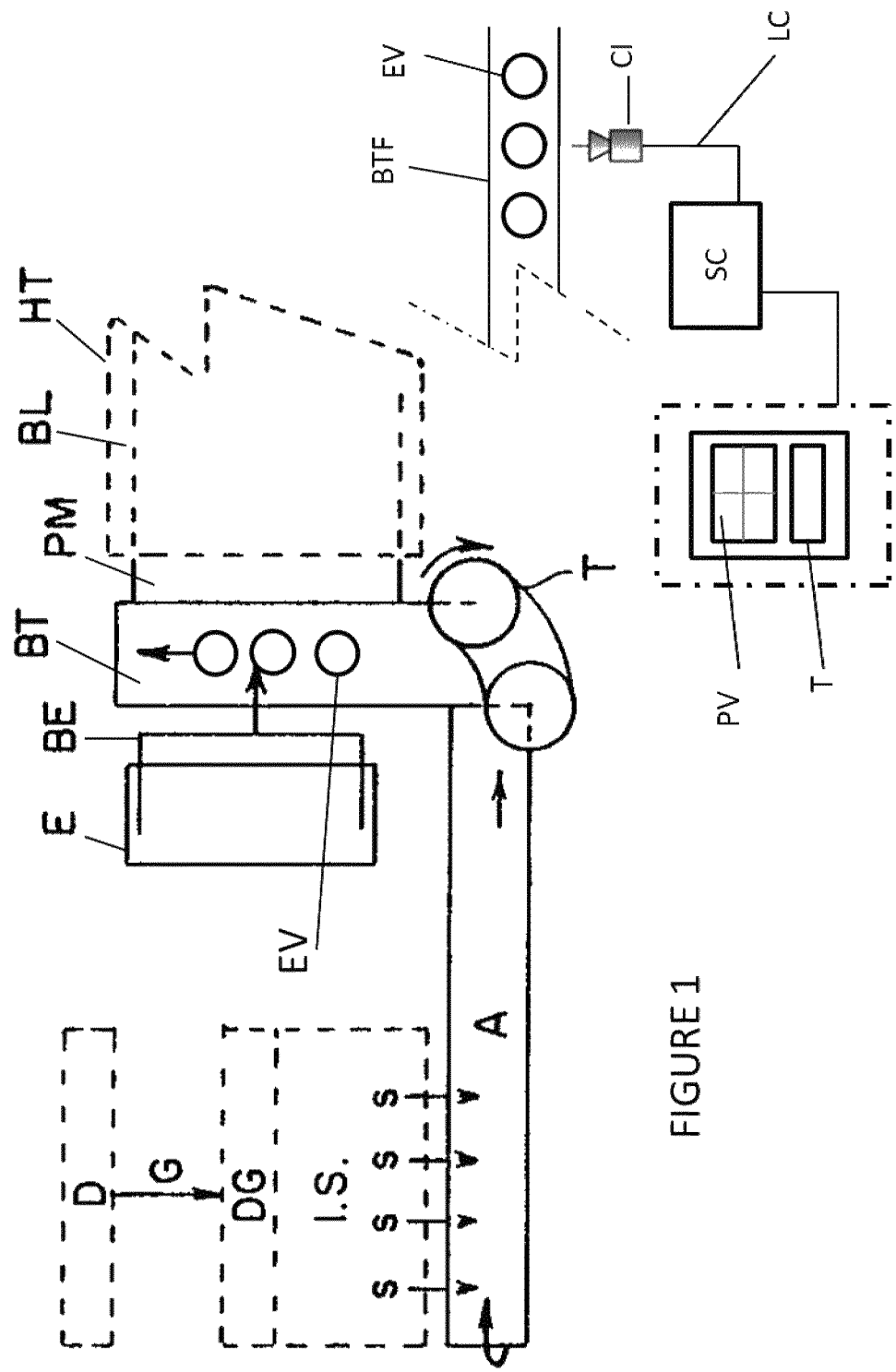
FIG. 1 is a schematic diagram of the design of a multi-section container production line, having a mold identification system in accordance with the present invention.

Referring to FIG. 1, the glassware production process and the manufacture of glasses or containers, the molten glass is fed from a feeder D in the form of gobs G, which are distributed by a distributor DG to the individual forming sections of an I.S. machine, each consisting of a parison mold and a blow mold (not shown). The articles formed in each mold of each of the sections S, still hot, are first deposited on a dead plate (not shown) in the respective section and then pushed from there onto a conveyor belt (A) that moves the glass containers EV from all sections to a transfer mechanism T at the end of the section, which controls the flow of the articles by separating them evenly and changing the flow direction by 90° and placing them one by one on a cross conveyor BT in an evenly spaced row. Once a complete row of articles has been formed, a pusher E simultaneously transfers by means of a pusher bar BE all containers of the row from the transverse conveyor belt BT through transition dead plates PM of a linear conveyor belt BL of an annealing furnace HT.

In addition to the above, once the containers have come out of the annealing oven HT, the containers EV are transferred on conveyor belts BTF (cold side) and are subjected to a final review process where quality aspects are confirmed and meet all design specifications and then are sent to packaging.

However, for the manufacturing process of perfumery containers and given that the known processes include excessive marking (identification codes) that damage the image of the container, the present invention relates to the use of a method and system for determining the manufacture of a glass container with its mold number, which uses a modulation code based on coordinate patterns using the Fibonacci System or Sinusoidal system that allows identifying the mold number that is producing a defective product.

Figure 2A:
FIGS. 2A to 2C is a schematic diagram showing the use of the sinusoidal system for reading molds in accordance with the present invention.
Figure 2B:
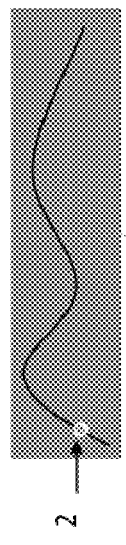
Figure 2C:
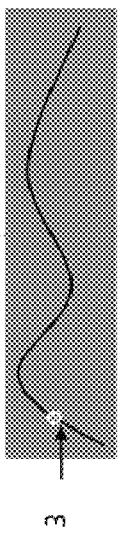
Figure 6:
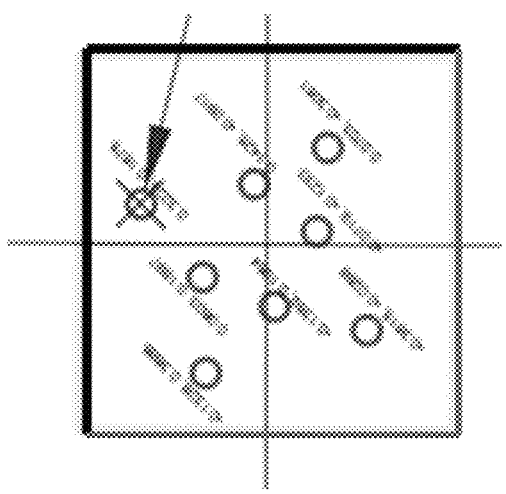
FIG. 6 is a schematic diagram showing the use of the Fibonacci coordinate method for reading square containers.

The system and method will be described referring to FIGS. 2A to 2C and 3. For example, FIG. 2 shows a schematic diagram of a Sinusoidal system to read square molds.

The inspection method of the present invention comprises the following stages.

First, it is necessary to establish a pattern of x, y, and z coordinates that will be marked on the bottom of the container from its design, establishing different coordinate points for each mold. These points define a small cavity in the bottom of each mold of approximately 10 to 60 thousandths of diameter with 5 to 10 thousandths of depth, which, at the moment of manufacturing the container, generates a bead or glass protuberance at the bottom of the container.

The x, y coordinate pattern is programmed under the concept of a sinusoidal coordinate method which is mathematically represented as:

$$y = A \cdot \text{sen}(\omega x + \varphi 0) + B,$$

where A is the amplitude, $\omega$ the period, $\varphi 0$ the phase shift and B the vertical displacement.

As can be seen in FIG. 2A to 2C, graph 2A shows a first point 1, based on a Cartesian plane to assign a first location to any point in the plane to a first mold. Graph 2B shows a second point 2, under the same Cartesian plane to assign a second location to a second mold. Graph 2C shows a third point 3, under the same Cartesian plane to assign a third location to a third mold and so on for each mold. Typically, a container forming machine is from 8 to 12 sections.

In this way, each bead or protuberance is designed in each mold to locate a unique point coordinated in a plane, which will determine the assigned mold number, so that the coordinates will be unique in their possible modalities.

Once the coordinate pattern for each mold has been defined, they are programmed by means of an algorithm in a control system SC that will determine the center of each container by the difference or area of the base. In this way, the control algorithm will then determine the position of the bead or protuberance at the bottom of the container EV.

Using application software, coordinate points are obtained to determine the position of each small glass bead, unique for each container, which is programmed to determine the assigned cavity number.

Once the coordinate pattern has been programmed, the containers that have been formed in the forming machine and exited the annealing furnace HT, pass through the conveyor belts BTF (cold side), separately, where each glass bead or protuberance of each container will be detected by means of an optical positioning recognition system. This optical system is an inspection camera IC, located at the bottom of the BFT conveyor belt for determining the mold number related to the container. This inspection camera IC includes a light system determining the center of the container and the position of the bead or protuberance.

Figure 3:
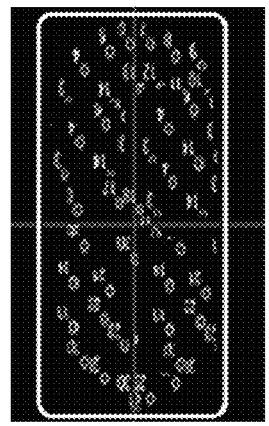
FIG. 3 is a visual representation of the container reading according to the sinusoidal system schematically illustrated in FIGS. 2A to 2C.
Figure 3A:
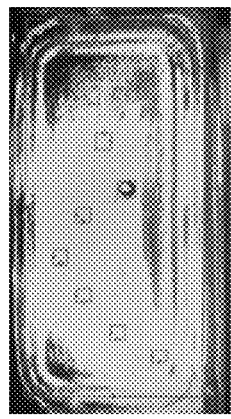
FIG. 3A shows a photograph of the rectangular bottom of a container, schematically showing the points that can be generated by a sinusoidal coordinate method.
Figure 7:
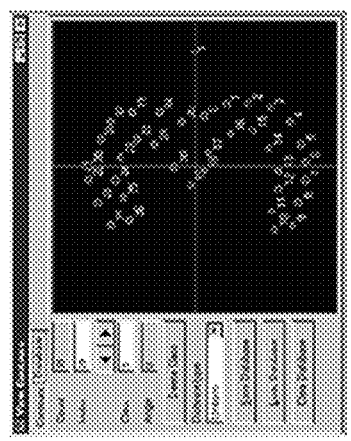
FIG. 7 is a display screen showing the distribution of engravings in each mold to generate mold recognition patterns; and, FIG. 8 is a schematic diagram of the system for determining the manufacture of a glass container with its mold number in accordance with the present invention.
Figure 8:
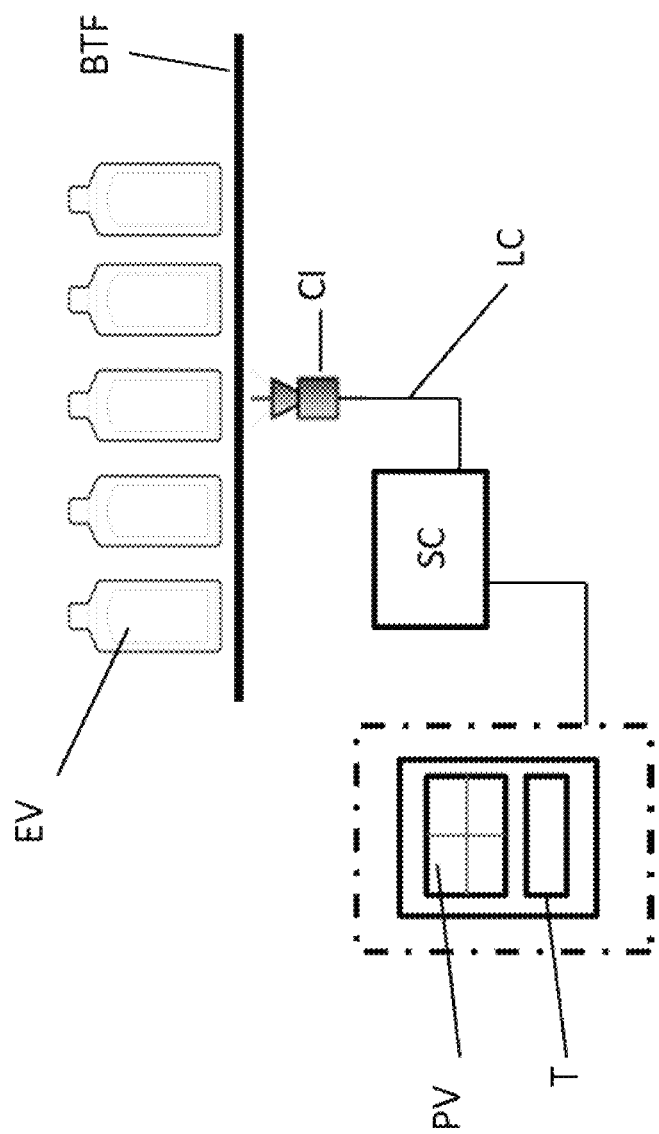

The inspection chamber IC allows the location of the bead at the bottom of the container in order to determine the cavity or mold number. The beads or protuberances are reflected on a display screen PV of the control system SC, which are reflected as shown in the screens of FIGS. 3, 5A and 7. The detection of each glass bead will make to identify, in case of any quality problem, reject the product and identify which mold is producing the container. It will also provide statistical information on quality and productivity.

A second embodiment of the invention, in the case of the manufacture of square or round containers, the coordinates patter is based on a Fibonacci series.

A Fibonacci sequence is one whose recurrence law is: $an = a_{n-1} + a_{n-2}$. This means, each term of the sequence is obtained by adding two of the previous terms. To start building it we need, therefore, two starting numbers, a1 and a2. Thus, a3 would be a2 a4 would be a3+a2 and so on.

The best known is the one with a1=1 and a2=1, whose terms are: 1, 1, 2, 3, 5, 8, 13, 21, 34, 55, 89, 144, 233, 377 . . . numbers known as Fibonacci numbers.

The terms of any Fibonacci sequence have the peculiarity that the ratio between two consecutive terms approaches the golden number (1.6180339887499 . . . ), that is, the limit of the quotients an+1/an tends to the golden number when n tends to infinity.

The golden number is the numerical value of the ratio between two line segments a and b (a longer than b), which satisfy the following relation:

The total length, sum of two segments a and h, is to the larger segment a, what this segment a is to the smaller segment b. Written as algebraic process:

$$\frac{a+b}{a} = \frac{a}{b}$$

In addition, Fibonacci series fulfill other properties, such as, for example, the sum of n terms is equal to the n+2 term minus one:

$$a1+a2+a3+a4+\ldots+an-1+an=an+2-1$$

A Fibonacci spiral space sampling pattern is illustrated in FIGS. 4A-4C. This pattern includes several sample points used to reconstruct an image which was acquired with several separate Fibonacci spiral paths, one of which is illustrated by the sample points shown as dots in FIG. 4A. From this illustration it is evident that the interlocking Fibonacci spiral sampling paths provide substantially uniform sampling throughout the defined space at the bottom of the container.

As in example shown in FIGS. 2A-2C, a series of points is programmed under the concept of Fibonacci series. For example, a series of rectangles can be constructed using the numbers in this sequence. It starts with a square of side 1, the first two terms of the sequence that would correspond to a first point 1 in mold 4A. Another equal one is built over it and a first Fibonacci rectangle of dimensions 2×1 is formed, which would correspond to a second point 2 in mold 4B. On the side of two units a square is built and we have a new 3×2 rectangle that would correspond to a third point 3 in mold 4C. The sequence would continue building another square, to obtain a 5×3 rectangle, then a 5×8, 8×13, 13×21, which would correspond to each points assigned to each mold. If we join the vertices of these rectangles, a growth spiral is formed to show the distribution of points (glass beads) that will be shown in each mold.

As in the embodiment shown in FIGS. 2A-2C, the points coordinated by Fibonacci series are programmed into a control system to determine the position of each small glass bead, unique to each container, which is programmed to determine the assigned cavity number.

The optical positioning recognition system is the same for this same case, i.e. the inspection camera IC located at the bottom of a BFT conveyor belt, will determine the mold number related to the container.

The inspection system would consist of an SC control system for programming a mold programming pattern according to a preset coordinate system using a Sinusoidal or Fibonacci coordinate method; an optical positioning recognition system, e.g. an inspection camera IC, located at the bottom of a conveyor belt will determine the sequence pattern of each mold and the center of the container; the control system including a keyboard T and a display screen PV. The keyboard T and display screen PV are connected via connection lines LC and control system SC to allow an operator to control the production and display of images on the display screen PV. The control system SC receives, through the connection lines LC, commands from the operator specifying the scanning sequence to be performed. The control system SC generates the detection points (glass beads) to perform the desired scanning sequence, and produce data determining the mold number related to the container.

From the foregoing, a system and method for determining the manufacture of a glass container with its mold number has been described and it will be apparent to industry experts that other possible developments or improvements may be made, which may be considered within the field determined by the following claims.

We claim:

1. Method for determining the manufacture of a glass container with its mold number of the type comprises the steps of:
   providing at least one container forming mold;
   establishing a marking of the molds according to a pre-established coordinate system based on a Fibonacci or sinusoidal system, to identify a mold number with the container to be formed in said mold;
   programing in control means, the pre-established coordinate system according to different coordinate points for each mold;
   forming the containers with a bead or protuberance located at the bottom of each container according to the pre-established coordinate system;
   conveying the containers on a conveyor belt; and,
   inspecting containers by optical means located on at least one section of the conveyor belt, to identify through the position of the bead or protuberance, the mold number related to the container.

2. The method for determining the manufacture of a glass container with its mold number according to claim 1, wherein the bead or protuberance is formed by a cavity modeled in the mold, which is formed at the time of manufacturing the container.

3. The method for determining the manufacture of a glass container with its mold number in accordance with claim 1, wherein the Fibonacci series is mathematically represented as follows:

$$a1+a2+a3+a4+\ldots+an-1+an=an+2-1$$

where: a1=1 y a2=1.

4. The method for determining the manufacture of a glass container with its mold number according to claim 1, where the sinusoidal system is mathematically represented as follows:

$$y=A\cdot sen(\omega x+\varphi 0)+B,$$

where A is the amplitude, ω the period, φ0 the phase shift and B the vertical displacement.

5. The method for determining the manufacture of a glass container with its mold number according to claim 1, wherein the cavity at the bottom of each mold is about 10 and up to 60 thousandths in diameter and 5 to 10 thousandths deep.

6. The method for determining the manufacture of a glass container with its mold number according to claim 1, wherein the position of the beads or protuberances are reflected in a contour pattern recognition module.

7. The method for determining the manufacture of a glass container with its mold number according to claim 6, where the contour pattern recognition module includes a display screen.

8. The method for determining the manufacture of a glass container with its mold number according to claim 3, where the Fibonacci series is used for square and cylindrical containers.

9. The method for determining the manufacture of a glass container with its mold number according to claim 5, where the sinusoidal system is used for rectangular containers.

10. System for determining the manufacture of a glass container with its mold number of the type comprising:
- glass container manufacturing molds that include a mold marking to generate a bead or protuberance on the bottom of the container according to a pre-established coordinate system using a Fibonacci system or Sinusoidal system, to identify a container to be formed in said mold;
- control means to program a mold programming pattern according to a pre-established coordinates;
- an optical recognition and positioning system, located in proximity to a container conveyor belt for determining the manufacturing sequence pattern of each mold and the center of each container; and,
- display means connected to the optical system and control means for displaying and detecting the beads or protuberances of each container, to produce data that will determine the mold number related to the container.

11. The system for determining the manufacture of a glass container with its mold number in accordance with claim 10, wherein the mold mark is a cavity formed in the bottom of such mold approximately 10 thousandths in diameter and 5 thousandths deep.

12. The system for determining the manufacture of a glass container with its mold number in accordance with claim 10, wherein the optical means is an inspection camera.

13. The system for determining the manufacture of a glass container with its mold number according to claim 10, wherein the control means includes an image display screen.

14. The system for determining the manufacture of a glass container with its mold number according to claim 10, where the optical recognition and positioning system is located below the container conveyor belt.

15. The system for determining the manufacture of a glass container with its mold number according to claim 10, where the mold programming pattern according to the pre-established coordinates is based on a Fibonacci serie.

16. The system for determining the manufacture of a glass container with its mold number according to claim 10, where the mold programming pattern according to the pre-established coordinates is based on a Sinusoidal serie.

\* \* \* \* \*